United States Patent [19]

Yagishita et al.

[11] Patent Number: 4,686,043
[45] Date of Patent: Aug. 11, 1987

[54] BATCH TYPE FILTER SYSTEM

[75] Inventors: Koichi Yagishita, Nagoya; Yasunori Iriyama, Iwakura; Mitsumasa Hirose, Ohgaki, all of Japan

[73] Assignee: Kabushiki Kaisha Yagishita, Japan

[21] Appl. No.: 844,197

[22] Filed: Mar. 26, 1986

[30] Foreign Application Priority Data

Mar. 27, 1985 [JP] Japan .................................. 60-60774

[51] Int. Cl.$^4$ ............................................ B01D 29/02
[52] U.S. Cl. .................................................. 210/387
[58] Field of Search .......................... 210/387, 400, 483

[56] References Cited

U.S. PATENT DOCUMENTS 2,183,896 12/1939 Rupp et al. ......................... 210/400
4,233,157 11/1980 Miller .................................. 210/387

Primary Examiner—Ivars Cintins
Attorney, Agent, or Firm—Lowe, Price, LeBlanc, Becker & Shur

[57] ABSTRACT

Disclosed herein is a batch type filter system including a cover provided with a supply pipe for supplying raw liquid and air, a plate having a filter medium support on an upper surface thereof and a filtrate exhaust pipe, said cover being vertically separable from said plate, a plurality of filter medium moving rollers provided on both sides of said cover and said plate, and a sheet-like long filter medium stretched over said rollers and adapted to be moved by a predetermined length per one batch of filtration, said filter medium being temporarily fixedly held between the circumferential portion of said cover and the curcumferential portion of said plate. The improvement in the batch type filter system comprises arcuately curved tension bars provided at such positions where a moving direction of the filter medium is changed and on downstream sides of said filter medium moving rollers, so as to apply a larger tensile force to a central portion of said filter medium than to both edge portions thereof.

2 Claims, 2 Drawing Figures

4,686,043

BATCH TYPE FILTER SYSTEM

BACKGROUND OF THE INVENTION

The present invention relates to a filter for filtering a suspension under pressure and uncontinuously exhausting a filter cake having a low content of a mother liquor.

In a well-known filter system, a filter cloth is disposed on a filter plate provided on the upper surface of a flat filter medium support, and a cover arranged above the filter plate is brought into tight contact with the circumferential portion of the filter plate. Then, a suspension is supplied under pressure to a space defined between the cover and the filter cloth to carry out filtration. When filtration efficiency is reduced because of stacking of a filter cake on the filter cloth, supply of the suspension is stopped, and pressurized air is supplied to reduce mother liquor content of the filter cake. Then, the cover is separated from the filter plate to remove the filter cake as well as the filter cloth. Further, in another well-known filter system, a long filter cloth is used, and a predetermined length of the filter cloth is moved every time a filtering operation is carried out to thereby remove the filter cake. While the drawn filter cloth on which the filter cake is deposited is sometimes abandoned after one use, it is economically preferred to wash and regenerate the filter cloth for reuse. Therefore, a soft cloth such as non-woven fabric cloth is widely used as the filter cloth from the viewpoints of filtration efficiency and economy. However, when a fixed length of such a soft filter cloth is moved by a filter cloth feeding roller and a filter cloth drawing roller, ununiform expansion and contraction of the filter cloth is apt to occur to create lateral deviation. Even if such deviation is intended to be restricted by guides provided on both sides of the filter cloth, there are only created wrinkles of the filter cloth, and the guides cannot return the filter cloth to a normal position.

To this end, when there occurs deviation of a moving position of the filter cloth, the deviation is conventionally corrected by changing the inclination of the filter cloth drawing roll or friction bars provided on front and rear sides of a filtering position. In a conventional control system, such correction of the deviation is automatically carried out by using a photoelectric sensor for detection of an end portion of the filter cloth to control the inclination of the friciton bars. However, it is impossible to eliminate generation of meandering causing the expansion and contraction of the filter cloth. As a result, an excessive width of the filter cloth is required, and a narrow filtering surface only is unavoidably used, which results in economical disadvantages.

SUMMARY OF THE INVENTION

It is an object of the present invention to provide an economical automatic adjusting mechanism for a filter system which may prevent meandering of a filter medium in moving a soft long sheet-like filter cloth as the filter medium.

It is another object of the present invention to provide an economical filter system which has a large capacity of filtration by utilizing the entire width of the filter medium for filtration.

According to the present invention, in a batch type filter system including a cover provided with a supply pipe for supplying raw liquid and air, a plate having a filter medium support on an upper surface thereof and a filtrate exhaust pipe, said cover being vertically separatable from said plate, a plurality of filter medium moving rollers provided on both sides of said cover and said plate, and a sheet-like long filter medium stretched over said rollers and adapted to be moved by a predetermined length per one batch of filtration, said filter medium being temporarily fixedly held between the circumferential portion of said cover and the circumferential portion of said plate; the improvement comprises arcuately curved tension bars provided at such positions where a moving direction of said filter medium is changed on downstream sides of said filter medium moving rollers, so as to apply a larger tensile force to a central portion of said filter medium than to both edge portions thereof.

The invention will be more fully understood from the following detailed description and appended claims when taken with the drawings.

DETAILED DESCRIPTION OF THE PREFERRED EMBODIMENT

Figure 1:
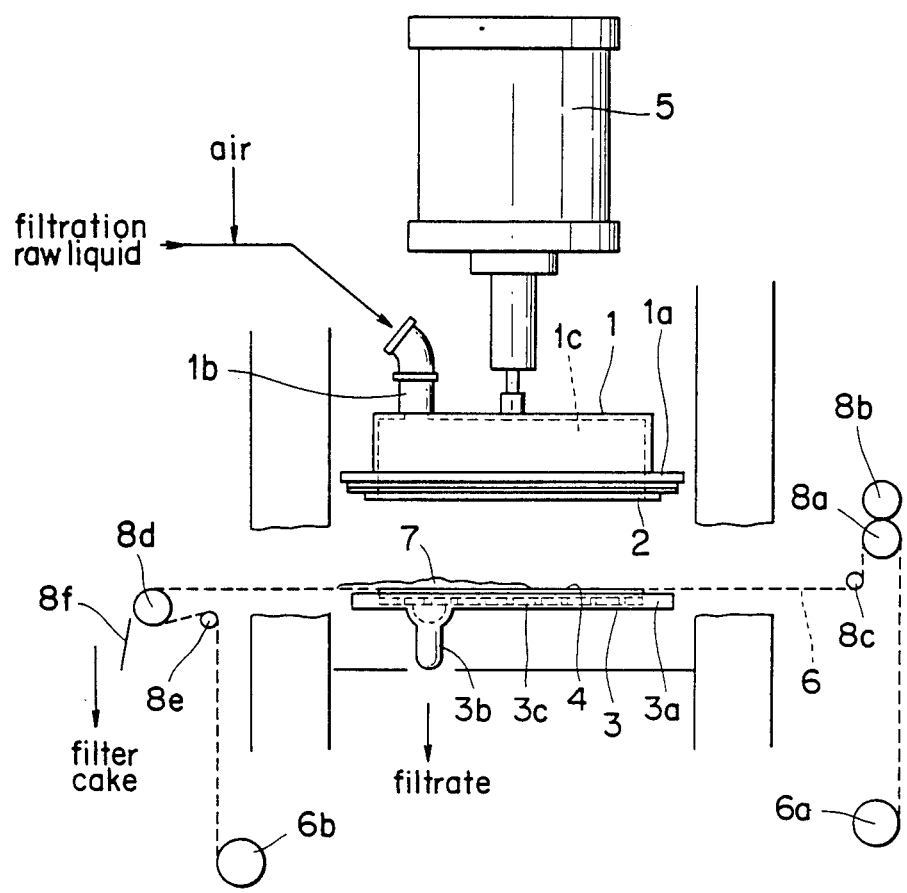
FIG. 1 is an illustration showing the batch type filter system of the present invention.

Referring to FIG. 1, the filter system of a preferred embodiment according to the present invention includes a cover 1, an annular packing 2 attached to the lower surface of a circumferential portion 1a of the cover 1, a plate 3, a filter medium support 4 mounted on the upper recessed portion of the plate 3, an air cylinder 5 and a filter paper 6. The filter paper 6 is fed from a new filter paper roll 6a through a feed roller 8a and a pinch roller 8b and a tension bar 8c onto the filter medium support 4. A feeding direction of the filter paper 6 is converted at the tension bar 8c by about 90 degrees.

The cover 1 is provided with a supply pipe 1b for supplying raw liquid and air, and is designed to be vertically moved by the air cylinder 5. When the cover 1 is lowered, the filter paper 6 is fixedly held between a circumferential portion 3a of the plate 3 and the annular packing 2. As the filter paper 6 is supported by the filter medium support 4, the raw liquid is supplied from the supply pipe 1b into a raw liquid chamber 1c, and is filtered through the filter paper 6 and the filter medium support 4. Then, the filtrate is discharged from a filtrate chamber 3c through an exhaust pipe 3b.

On the other hand, when an amount of filter cake 7 deposited on the filter paper increases, supply of the raw liquid is stopped at an appropriate time, and pressurized air is supplied, so as to eliminate the difficulty of filtration due to an increase in pressure in the raw liquid chamber 1c. As a result, the raw liquid contained in the filter cake is wholly recovered as the filtrate, and the dewatered filter cake 7 only remains on the filter paper 6. Then, the cover 1 is upwardly moved by the air cylinder 5 to release the filter paper 6.

The filter paper 6 is fed through a drawing roller 8d, and then the filter cake 7 is separated off by a scraper 8f. Then, a feeding direction of the filter paper 6 is converted at a tension bar 8e by about 90 degrees, and finally the filter paper 6 is wound around a roll 6b.

Figure 2:
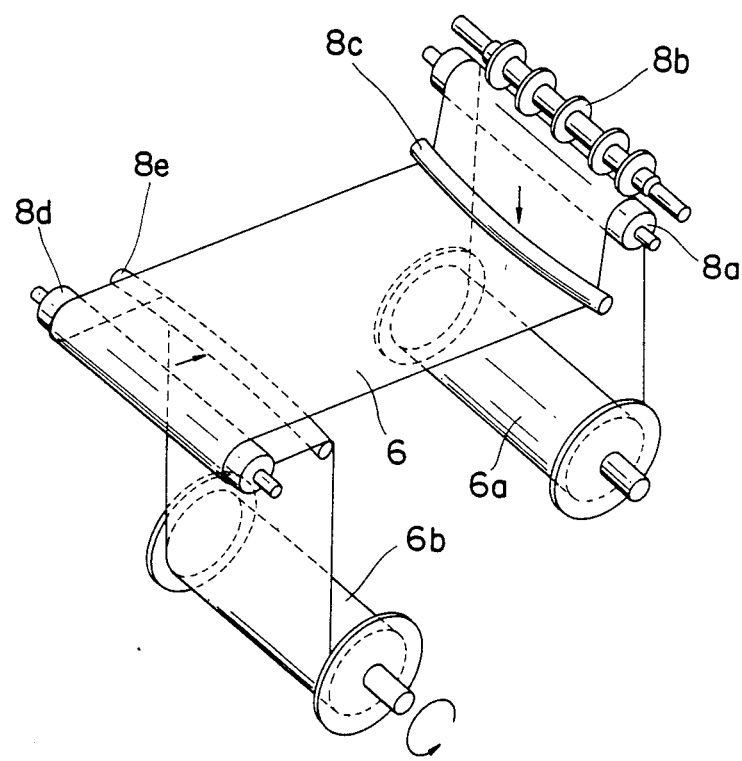
FIG. 2 is an illustration showing a mechanism for preventing meandering of the filter medium.

Referring to FIG. 2 showing a route of the filter paper 6, the filter paper 6 advances downwardly from the feed roll 8a, and changes its advancing direction horizontally at the position of the tension bar 8c. The tension bar 8c is downwardly curved in an arcuate fashion, and the degree of curvature thereof is such that the radius of curvature is preferably about 1 to 10 meters.

The filter paper 6 as horizontally advanced is used for filtration, and is then turned back along the drawing roller 8d to horizontally reversely move. Then, the filter paper 6 changes its advancing direction downwardly again at the position of the tension bar 8e, and finally reaches the roll 6b. As similar to the tension bar 8c, the tension bar 8e is arcuately curved to such a degree that the radius of curvature is about 1 to 10 meters, and the direction of curvature is rightward. In other words, both the tension bars 8c and 8e are designed to apply a large tensile force to the central portion of the filter paper.

Even when the radius of curvature of the tension bars is more than 10 meters, it is effected to suppress meandering of the filter paper 6. However, an excessively small degree of curvature is less effective. Conversely, when the radius of curvature is less than one meter, the filter paper 6 advances with the side edge portions thereof separated or floating from the tension bars, which adversely affects prevention of meandering.

For the comparative purpose, a centrally expanded roller was used in substitution for the tension bars of the invention, but it was less effective in preventing meandering of the filter paper.

Having thus described the preferred embodiment of the invention, it should be understood that numerous structural modifications and adaptions may be made without departing from the spirit of the invention.

What is claimed is:

1. In a batch type filter system adapted for movement of a sheet-like long filter medium therethrough including a cover provided with a supply pipe for supplying raw liquid and air, a plate having a filter medium support on an upper surface thereof and a filtrate exhaust pipe, said cover being vertically separable from said plate, a plurality of filter medium moving rollers provided on both the upstream and downstream sides of said cover and said plate, and a sheet-like long filter medium stretched over said rollers and adapted to be moved a predetermined length in the downstream direction per one batch of filtration, said filter medium being temporarily fixedly held between the circumferential portion of said cover and the circumferential portion of said plate; the improvement comprises arcuately curved tension bars, each of said arcuately curved tension bars being located where the moving direction of said filter medium is changed and downstream of at least one of said filter medium moving rollers, so as to apply a larger tensile force to a central portion of said filter medium than to both edge portions thereof.

2. The batch type filter system as defined in claim 1, wherein a degree of curvature of said tension bars is such that a radius of curvature is about 1 to 10 meters.

* * * * *